Dec. 25, 1962  W. F. HARRINGTON  3,069,987
CAMERA
Filed June 1, 1960
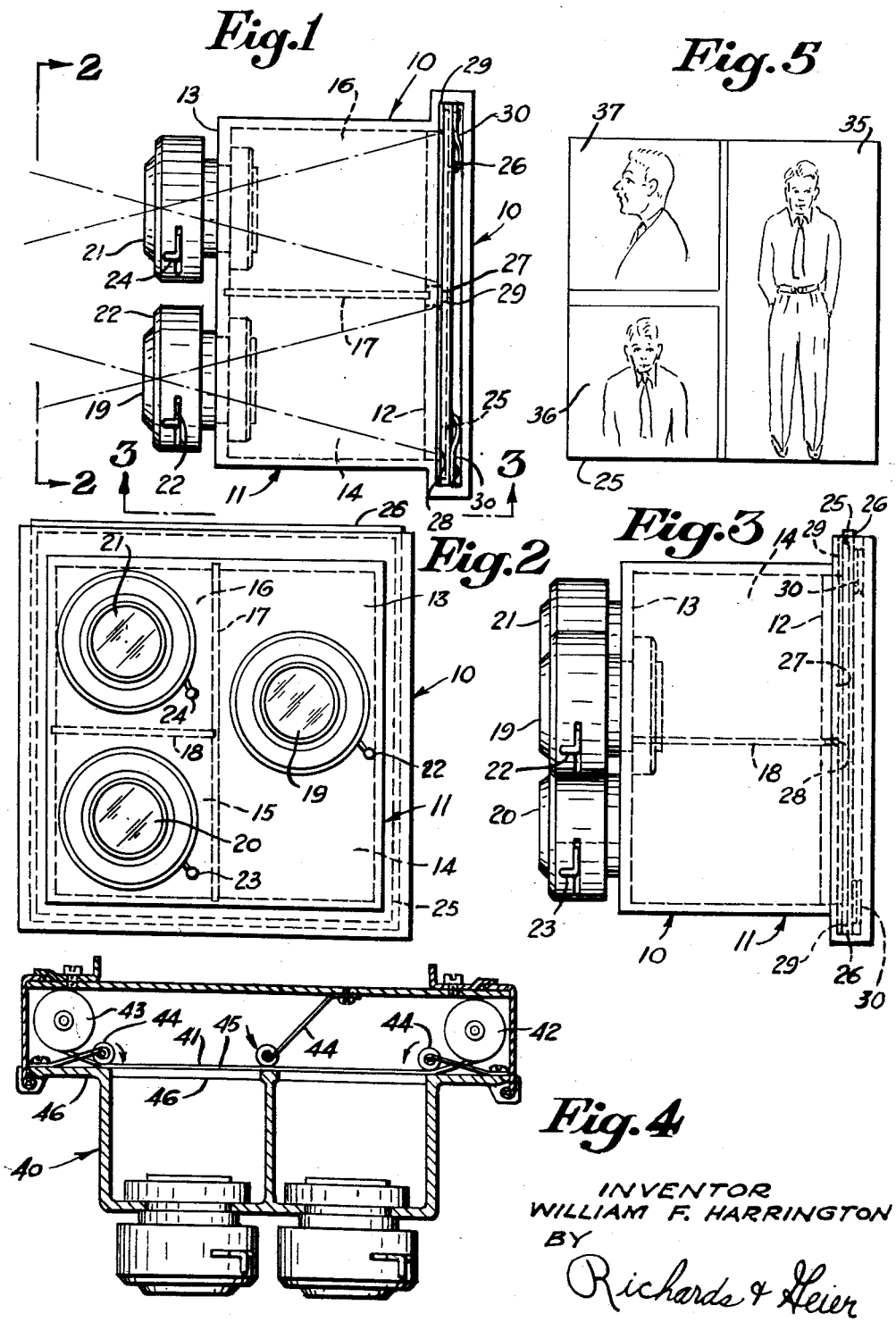
INVENTOR
WILLIAM F. HARRINGTON
BY
Richards & Heier
ATTORNEYS

United States Patent Office 3,069,987
Patented Dec. 25, 1962

3,069,987
CAMERA
William F. Harrington, 469 Valley Place, Englewood, N.J.
Filed June 1, 1960, Ser. No. 33,162
1 Claim. (Cl. 95—36)

This invention relates to a camera, and refers more particularly, to a camera for making a plurality of individual separate photographs on the same segment of film while the film remains stationary.

In prior art, cameras are known which have two objective lens systems, and two separate films which may be exposed separately or simultaneously. Also known in prior art are various types of stereoscopic cameras.

An object of the present invention is to provide a camera having a plurality of lens systems and individually actuatable shutters, for making a plurality of individual separate photographs on a segment of film while the film remains stationary between successive exposures.

Another object is to provide a camera particularly suitable for taking photographs related to police work, wherein a plurality of different photographs of a particular individual may be obtained on a single segment or piece of film while the film remains stationary.

A further object is to provide a camera for taking a plurality of photographs on a single segment of film, which is easy and inexpensive to manufacture and which is easy to operate.

Other objects of the present invention will become apparent in the course of the following specification.

The objects of the present invention may be realized through the provision of a camera having a plurality of lens systems each provided with an individually actuatable shutter. The interior of the camera housing is divided into a series of separate compartments extending from the vicinity of the shutters and lenses back to the area in which the film is disposed. Each lens and shutter combination operates with respect to one of said compartments, whereby when a particular shutter is actuated, only that portion of the film which is disposed adjacent to the open-end of the respective compartment will be exposed by light admitted through that shutter. Each shutter may be separately operated to expose a different portion of the film while the film remains stationary.

The invention will appear more clearly from the following detailed description when taken in connection with the accompanying drawing showing, by way of example, preferred embodiments of the inventive idea.

In the drawing:

FIGURE 1 is a top view of a camera of the present invention;

FIGURE 2 is a front view taken along line 2—2 of FIGURE 1;

FIGURE 3 is a side view taken along line 3—3 of FIGURE 1;

FIGURE 4 is a plan cross-sectional view of a camera of the present invention utilizing roll type film; and FIGURE 5 shows a segment of film having a plurality of separate photographs thereon after having been exposed in a camera of the present invention.

A camera 10 of the present invention is shown in top view in FIGURE 1, front view in FIGURE 2, and side view in FIGURE 3. The camera 10 comprises a camera housing 11 having a rear end portion 12 and a front end wall 13. The housing 11 has its interior divided into separate compartments 14, 15, and 16, by means of light-tight partitions, such as vertical partition 17 and horizontal partition 18, both of which extend from the front end wall 13 to the vicinity of the rear end portion 12. In each compartment 14, 15, 16 is disposed a separate lens system 19, 20, 21, which extends through the front end wall 13. Separately actuatable shutter systems 22, 23, and 24 operate in conjunction with lens systems 19, 20, 21, respectively. The lens systems 19, 20, 21 and shutter systems 22, 23, 24 may be any suitable system known in prior art. It is also quite obvious that wide angle lenses, telescopic lenses or any other suitable lens improvement may be incorporated in the present invention. Also, if desired, the shutters 22, 23, 24 may be constructed so as to operate simultaneously or individually as desired. The film may be either the single sheet plate-type or the roll-type known in prior art. If plate-type film 25 is used as shown in FIGURES 1 to 3, a holder 26 is used to hold the film 25 in the camera housing 11. The holder 26 is so disposed in housing 11 that the film 25 is held taut and in contact with the rear surfaces 27, 28 of the partitions 17, 18 which are adapted for contacting the film surface. If desired, the rear surfaces 27, 28 may be covered with a cushioning material 29, such as foam rubber or the like. This construction prevents light from one compartment from exposing any portion of the film except that disposed directly adjacent the open end of that compartment.

If desired, the holder 26 may be spring loaded by springs 30 to guarantee a light-tight contact between the surface of film 25 and rear surfaces 27, 28 of partitions 17, 18.

The present invention may be utilized housing either plate-type film or roll-film. When roll-film is utilized, it is possible to take three photographs individually without the necessity of moving the film between the first and second and second and third exposures. When a third exposed photograph has been made the film may be rolled the proper amount so that an unexposed portion of the film is then disposed behind the three separate compartments, whereupon the photographing process may be repeated again.

The use and operation of the camera 10 of the present invention as utilized, for example, in one facet of police work, is as follows: As is well known, when a criminal suspect has been apprehended by the Police Department, it is generally desired that photographs be taken of the particular individual involved. Prior experience has indicated that one photograph is not sufficient for all types of necessary identification. It is usually desired that the police records have a full length photograph of the individual from the top of his head to the bottom of his feet, and this photograph is usually a front view. Also, a close-up front view of the individual is usually desired in either a standing or sitting position, as well as a side profile of the individual, either standing or sitting. Thus, as can be clearly seen, what is desired is not three simultaneous photographs of the individual, but rather three separate photographs exhibiting different identifying characteristics of the person involved. Heretofore, it has been necessary for the police photographer to have an individual stand a given distance from the camera in order to allow the photographer to take a full length front view photograph. After this photograph has been completed, if a plate-type film camera is used, the plate film must be removed and a second plate film inserted in the camera. It is then necessary either for the photographer to move closer to the individual being photographed or for the individual to move closer to the photographer, so that the photographer may take a close-up front photograph of the individual's facial characteristics. Upon taking this second photograph it is then necessary for the photographer to remove the plate-type film and to insert a third plate film, and then to take the individual's profile photograph. Obviously, this entire process is time consuming and is particularly difficult to accomplish when the individual being photographed is unruly and prone to causing disturbances.

With the camera 10 of the present invention the time consuming steps outlined above are entirely eliminated. The individual to be photographed is made to stand at a selected spot in front of the usual scale for photographing. As shown in FIG. 2, the optical axis of the lens 19 is situated above the center of the film exposed by the length thereof. This is so arranged that the parallax effect between the person being photographed and the height scale in front of which he is standing—which would give a false reading of his height—is avoided. The police photographer inserts a plate-type film 25 into camera 10. The springs 30 force the film into tight contact with the rear surfaces of partitions 17, 18. The lens 19 may be a wide angle vertically disposed lens such that it will take the individual's picture from head to toe. Therefore, the police photographer needs merely to actuate shutter 22 which allows light to pass through lens system 19 and compartment 14, and which exposes a portion 35 of film 25 as shown in FIGURE 5. Since the film 25 is in contact with surfaces 27, 28, the light from compartment 14 can expose only that portion of the film 25 directly adjacent compartment 14, and none of the light can enter compartments 15, 16 nor can it expose portions 36, 37 of film 25. The police photographer next needs merely to actuate shutter 23, which corresponds to lens system 20 (which may be a telescopic lens), to get a frontal photograph 36 of the person involved. When the shutter 23 is actuated, light passes through lens system 20 and compartment 15 and exposes portion 36 of film 25. The person being photographed is then made to turn 90° so that his profile is exposed to the camera. The photographer then actuates shutter 24 so that light may pass through lens system 21 and compartment 16, so as to expose portion 37 of film 25. The film 25 may then be removed from the camera and developed, and results in a single sheet of plate-type film having a full length photograph 35 of the person involved, along with a close-up front facial photograph 36 and a side profile photograph 37. It should be noted that the entire process of taking the three pictures can be accomplished in a few seconds, and in fact will be completed before the unruly individual involved realizes what has transpired.

Of course, the present invention has many other useful functions besides that described.

In FIGURE 4 is shown a plan cross-sectional view of an embodiment 40 of the present invention, utilizing roll-film 41 and having a supply spool 42 and take-up spool 43. Clips 44 (or springs) hold the film tight against rear surface 45 of partition 46. Otherwise, the construction and operation of embodiment 40 is similar to that of camera 10.

It should be noted that the film may be stationary during the photographing operation in either of the embodiments, and the roll-film 41 need only be advanced after the group of photographs has been taken.

Besides police work, the present invention may be used in all types of security work, or in any endeavor where the making of a plurality of individual photographs on a single segment of film would be useful.

Among the advantages of the camera of the present invention are the following: A plurality of individual separate photographs may be obtained on a given segment of film while the film remains stationary; a great saving of time between photographs is accomplished; and the camera of the present invention is easy and inexpensive to manufacture, easy to operate and is suitable for any type of lens and shutter.

It is apparent that the described examples are capable of many variations and modifications within the scope of the present invention. All such variations and modifications are to be included within the scope of the present invention.

What is claimed is:

A camera, for making records of alleged criminals in police work, said camera comprising a housing having a rear end portion, a front end wall and four rectangularly disposed side walls between said rear end portion and said front end wall, an inner light-tight partition extending within said housing between and parallel to two side walls and in contact with two other side walls and dividing the interior of said housing into two compartments of substantially equal size, another inner light-tight partition extending within one of said compartments perpendicularly to the first-mentioned partition and in contact with the first-metnioned partition and one of said side walls and dividing the interior of said one compartment into two smaller compartments of substantially equal size, a wide angle lens system disposed in the other one of the two first-mentioned compartments and extending through said front end wall, the axis of said wide angle lens system being higher than the center of the film being exposed for photographing an alleged criminal full length, a separate telescopic lens system disposed in each one of said smaller compartments and extending through said front end wall for photographing the face of said alleged criminal, a separate and separately actuatable shutter connected with each of said lens systems, a holder located within said housing adjacent to said rear end portion for holding within said housing a single film sheet adapted to be exposed without moving by any one of said lens systems, and springs connected with said holder for pressing the film sheet against said partitions.

References Cited in the file of this patent

UNITED STATES PATENTS

| 1,743,616 | Nolan | Jan. 14, 1930 |
| 2,042,983 | Fairchild | June 2, 1936 |
| 2,185,508 | Kunze | Jan. 2, 1940 |

FOREIGN PATENTS

| 327,755 | Switzerland | Mar. 31, 1958 |